United States Patent [19]

Giunta

[11] Patent Number: 4,967,695

[45] Date of Patent: Nov. 6, 1990

[54] SYSTEM FOR CONTROLLING THE MOVEMENT OF AN ANIMAL

[75] Inventor: James M. Giunta, Exton, Pa.

[73] Assignee: Invisible Fence Company, Inc., Wayne, Pa.

[21] Appl. No.: 370,702

[22] Filed: Jun. 23, 1989

[51] Int. Cl.[5] ............................................. A01K 15/00
[52] U.S. Cl. .................................................. 119/29
[58] Field of Search ........................ 119/29, 96, 109; 340/561, 564, 573; 455/41

[56] References Cited

U.S. PATENT DOCUMENTS

| | | |
|---|---|---|
| 2,023,950 | 12/1935 | Carter . |
| 2,131,291 | 9/1938 | Maust . |
| 2,741,224 | 4/1956 | Putnam . |
| 2,800,104 | 7/1957 | Cameron et al. . |
| 2,836,253 | 5/1958 | Lovell . |
| 2,996,043 | 8/1961 | Pettingill . |
| 3,021,391 | 2/1962 | Wagenseil et al. .................. 179/82 |
| 3,026,508 | 3/1962 | Muller ................................. 340/282 |
| 3,051,936 | 8/1962 | Finger et al. ........................ 340/280 |
| 3,076,058 | 1/1963 | Miller .................................. 179/82 |
| 3,105,120 | 9/1963 | Hanysz ................................. 179/82 |
| 3,110,891 | 11/1963 | Herrick et al. ..................... 340/258 |
| 3,128,840 | 4/1964 | Barrett, Jr. . |
| 3,150,321 | 9/1964 | Summers ............................. 325/28 |
| 3,157,871 | 11/1964 | Umanoff . |
| 3,162,726 | 12/1964 | Rosenberg et al. .................. 179/1 |
| 3,168,729 | 2/1965 | Volberg ............................... 340/258 |
| 3,175,047 | 3/1965 | Borberg ............................... 179/82 |
| 3,192,507 | 6/1965 | Sudges ................................ 340/171 |
| 3,472,333 | 10/1969 | Loewenstern . |
| 3,570,227 | 3/1971 | Bellinger . |
| 3,675,190 | 7/1972 | Auer, Jr. et al. . |
| 4,208,658 | 6/1980 | Fujiki et al. . |
| 4,225,226 | 9/1980 | Davidson et al. . |
| 4,229,724 | 10/1980 | Marcus . |
| 4,242,668 | 12/1980 | Herzog . |
| 4,297,684 | 10/1981 | Butter . |
| 4,371,934 | 2/1983 | Wahl . |
| 4,480,310 | 10/1984 | Alvarez . |
| 4,656,476 | 4/1987 | Tavtigian . |

*Primary Examiner*—Gene Mancene
*Assistant Examiner*—R. Thomas Price
*Attorney, Agent, or Firm*—Dann, Dorfman, Herrell and Skillman

[57] ABSTRACT

A system for controlling the movement of an animal relative to an area is provided having a signal transmitter with a transmitting antenna associated with said area. A loop of wire serves as the transmitting antenna and defines the boundary of the area. An electronic receiver carried by the animal is responsive to a signal produced by the transmitting antenna for producing an animal control output, such as an annoying tone or an electrical shock, to the animal whenever the animal moves into the vicinity of the transmitting antenna.

The electronic receiver has first and second orthogonal receiving antennas for receiving the signal produced by the wire loop antenna. Each antenna receives a respective component of the transmitted signal. Selection circuitry selects which of the respective components has greater magnitude and produces an actuating output to identify such component.

Switch circuitry receives the respective components of the transmitted signal from each of the respective receiving antennas. The switch circuitry responds to the actuating output produced by the selection circuitry to output the respective component having greater magnitude. Control circuitry is responsive to the selected component output from the switch circuit for producing the control output to the animal to control the movement of the animal relative to the selected area. As such, the control circuitry continuously responds to the receiving antenna having the best reception to produce the animal control output.

18 Claims, 2 Drawing Sheets

FIG. 2

SYSTEM FOR CONTROLLING THE MOVEMENT OF AN ANIMAL

FIELD OF THE INVENTION

The present invention relates to a system for controlling the movement of an animal relative to an area and, more particularly, to a system of the type having a signal transmitter with a transmitting antenna associated with the area for producing a signal and an electronic receiver carried by the animal which is responsive to the signal for producing a control output, such as an annoying sound or an electrical shock, to the animal in order to control the movement of the animal relative to the area.

BACKGROUND OF THE INVENTION

A problem frequently attendant with pet ownership is the need to confine the pet within a desired area such as the pet owner's yard. As a complication to the problem, many pet owners want to confine an animal to a particular area without erecting physical barriers such as fences or walls. One viable alternative has been the development of electronic confinement systems.

A conventional electronic confinement system includes a signal transmitter employing an antenna in the form of a wire which is either placed above the ground or, more frequently, buried slightly beneath the ground. The wire antenna is typically arranged as a loop to surround the particular area in which an animal is to be confined. The loop of wire functions as a transmitting antenna when energized by the transmitter to radiate a signal in the vicinity of the wire.

An electronic receiver incorporating a receiving antenna is typically attached to a collar worn by the animal. The electronic receiver is frequently powered by a small dry-cell battery contained within the receiver. A control circuit is associated with the receiver to produce an animal control output signal for providing some type of physical effect, such as an annoying noise or even a physical shock, to the animal. Whenever a predetermined signal level is received by the electronic receiver from the wire transmitting antenna surrounding the confined area, the control circuit is actuated to produce the control output signal to the animal. The control output signal is generally produced within some general range of distance away from the wire transmitting antenna and often intensifies as the animal continues to move into closer proximity to the transmitting antenna wire.

One of the problems associated with the conventional electronic confinement systems is that animals can sometimes approach and even pass beyond the wire transmitting antenna without receiving an adequate control signal to prevent such movement. This problem occurs because conventional electronic confinement systems employ an electronic receiver utilizing only a single receiving antenna. Because different movements of the animal result in different alignments of the receiving antenna relative to the transmitting antenna buried beneath the ground, the transmitted signal may not always be effectively received by the receiving antenna. As a result, an animal can sometimes approach Lhe transmitting antenna at certain orientations, such as raising or lowering its head, without receiving an adequate control signal to deter such movement.

In accordance with the present invention, a system is provided which overcomes the deficiencies of the conventional animal confinement systems. The system in accordance with the present invention provides improved reception of the transmitted signal as well as reliable generation of a sufficient animal control signal to deter unwanted animal movements.

SUMMARY OF THE INVENTION

In accordance with the present invention, a system is provided for controlling the movement of an animal relative to an area. The system includes a signal transmitter having a transmitting antenna associated with said area for producing a signal. An electronic receiver carried by the animal is responsive to the signal for producing a control output, such as an annoying tone or an electrical shock, to the animal.

The electronic receiver is powered by a portable, dry cell battery and includes at least first and second receiving antennas for receiving the signal produced by the signal transmitter. In order to provide proper reception of the transmitted signal, each receiving antenna has a different orientation relative to the other receiving antenna so that each receiving antenna receives a respective component of the transmitted signal. Preferably, the receiving antennas are orthogonally oriented.

Selection circuitry is provided for selecting which of the respective components of the transmitted signal received by the respective receiving antennas has greater magnitude. During operation, the selection circuitry produces an actuating output to identify the respective component having the greatest magnitude. For this purpose, the selection circuitry includes a first measuring circuit connected with the first receiving antenna for continuously measuring the magnitude of the respective component of the signal received by the first receiving antenna. The selection circuitry also includes a second measuring circuit connected with the second receiving antenna for continuously measuring the magnitude of the respective component of the signal received by the second receiving antenna. Comparator circuitry is connected with the first and second measuring circuits for continuously comparing the magnitudes of the respective components The comparator circuitry then produces the actuating output to identify the respective component having the greatest magnitude.

The electronic receiver also includes switch circuitry which receives the respective component of the signal received by the first receiving antenna as well as the respective component of the signal received by the second receiving antenna. The switch circuitry is responsive to the actuating output produced by the comparator circuitry for transmitting as an output the respective component having the greatest magnitude.

Control circuitry is responsive to the output from the switch circuit for producing the control output to the animal. For this purpose, the control circuitry receives the component having the greatest magnitude output by the switch circuit. In response, the control circuitry produces the control output in the form of an annoying tone or an electrical shock to the animal in order to control the movement of the animal relative to the selected area.

As such, the system employs multiple receiving antennas having different orientations so that an adequate signal can be received by the electronic receiver whenever the animal approaches the vicinity of the transmitting antenna. The system is also designed for switching in generally real time so that the antenna receiving the strongest signal is used to activate the control output to the animal.

BRIEF DESCRIPTION OF THE DRAWINGS

The foregoing summary, as well as the following detailed description of the preferred embodiments of the present invention, will be better understood when read in conjunction with the accompanying drawings in which:

FIG. 2 is a schematic representation of an alternate embodiment of the circuitry for the system of the present invention incorporating a signal transmitter and a signal receiver employing two orthogonal receiving antennas.

DETAILED DESCRIPTION OF THE PREFERRED EMBODIMENTS

Figure 1:
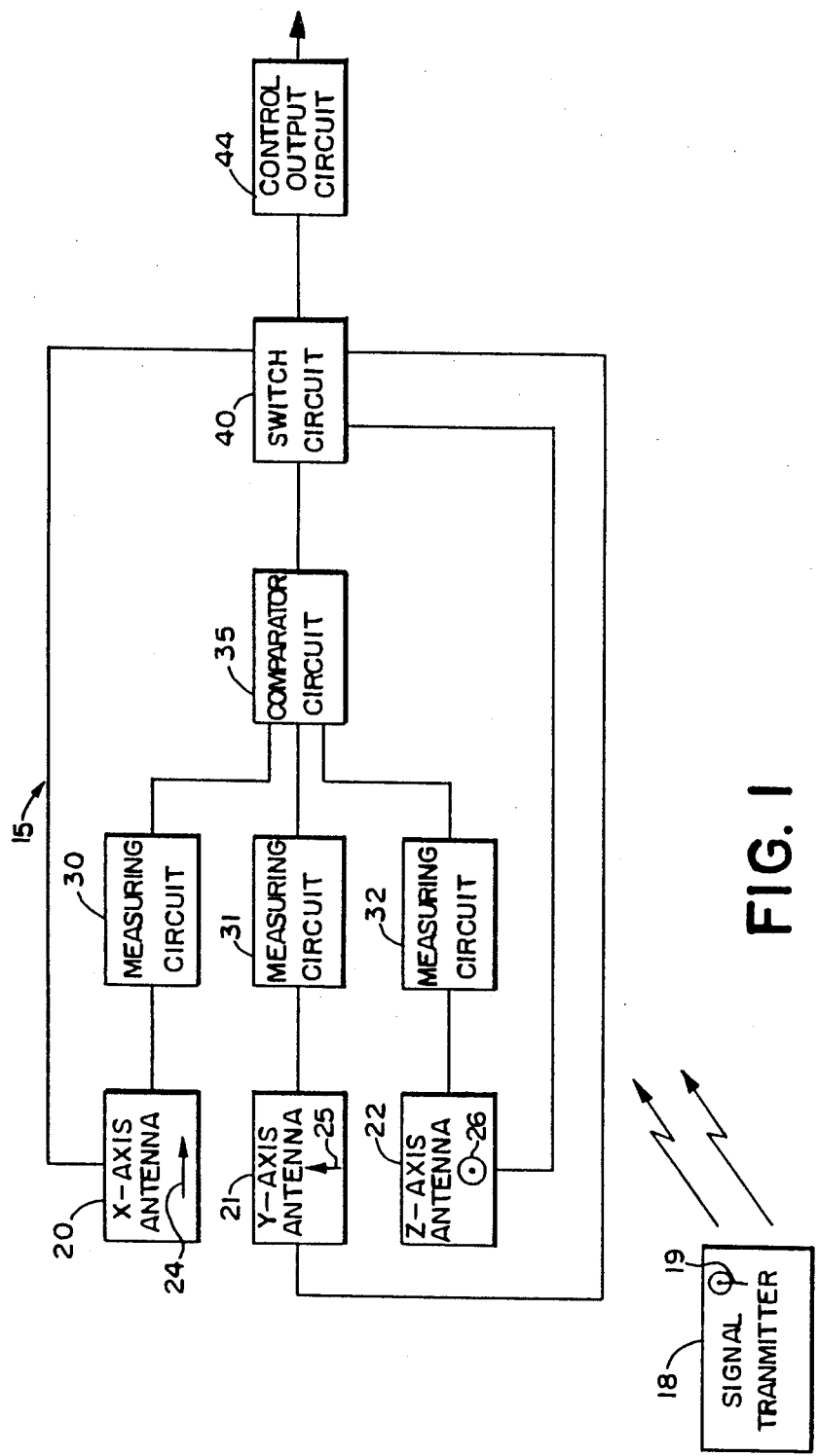
FIG. 1 is a block diagram of the circuitry for the system in accordance with the present invention incorporating a signal transmitter and a signal receiver employing three orthogonal receiving antennas.

Referring to FIG. 1, a system for controlling the movement of an animal relative to an area is depicted. The system includes a signal transmitter 18 having a transmitting antenna 19 associated with the area in which the animal is to be confined or, alternatively, from which the animal is to be kept. More specifically, the transmitting antenna 19 may be in the form of a wire loop antenna 19 which is dimensioned to surround a confinement area, such as a yard or a selected portion of the yard, either above the ground or buried slightly below the ground. Alternatively, the signal transmitter 18 may include an antenna having a suitable configuration for use indoors to keep the animal away from selected portions of the house.

The signal transmitter 18 operates to produce an A.C. signal for transmission by the transmitting antenna 19 at a sub-broadcast band frequency such as 10 Khz. The signal transmitter may be powered by a suitable power source such as a conventional power outlet in the home.

The system also includes an electronic receiver, generally designated 15, which operates at low power and is of suitable size to be carried by the animal. For example, the electronic receiver 15 may be attached to an animal collar. A small, portable dry-cell battery is incorporated within the electronic receiver 15 to supply the necessary power for operation of the receiver 15.

Within a selected range of distance from the transmitting antenna 19, the electronic receiver 15 is responsive to the signal produced by the signal transmitter 18 for producing a control output, such as an annoying tone or an electrical shock, to the animal. As the animal approaches the transmitting antenna 19, the strength of the signal received by the electronic receiver 15 increases. When the signal received by the electronic receiver 15 reaches a predetermined level, the control output is generated in order to deter the animal from moving any closer toward the transmitting antenna 19.

The electronic receiver 15 includes tuned antenna circuits 20, 21, and 22 for separately receiving respective components of the signal produced by the signal transmitter 18. For this purpose, tuned antenna circuits 20, 21 and 22 each include a respective receiving antenna 24, 25 and 26.

In order to prevent the undesired reception of ambient signals not produced by the signal transmitter 18, each of the tuned antenna circuits 20, 21 and 22 includes a tuning circuit, such as a resonant parallel LC circuit, connected with the respective receiving antenna to provide a selected band width of operation generally centered about or at least incorporating the frequency of the signal transmitted by signal transmitter 18. The tuning circuit functions to only permit an output of a selected range of frequencies incorporating the transmitted signal. As such, frequencies above and below the selected band width are filtered out.

In order to ensure adequate reception, each of the receiving antennas 24, 25 and 26 has a different orientation relative to the other receiving antennas. As a result, each receiving antenna receives a different component of the transmitted signal. In a preferred arrangement, each of the receiving antennas 24, 25 and 26 is orthogonally oriented relative to the other receiving antennas. For purpose of reference, as shown in FIG. 1, receiving antenna 24 is designated as the x-axis receiving antenna, antenna 25 is designated as the y-axis receiving antenna and antenna 26 is designated as the z-axis receiving antenna.

The orientations of the separate receiving antennas 24, 25 and 26 remain fixed relative to one other within the electronic receiver 15. However, during animal movement, the orientations of such antennas 24, 25 and 26 almost continuously change relative to the orientation of the transmitting antenna 19 and the signal transmitted from the signal transmitter 18. Since the receiving antennas 24, 25 and 26 are carried by the animal, any movement of the animal relative to the transmitting antenna 19 will cause a change in the positioning of the receiving antennas relative to the transmitting antenna. As such, the respective components of the transmitted signal received by the respective receiving antennas vary almost continuously with the movement of the animal and, as a consequence, the relative magnitudes of the respective components likewise vary.

In order to take into account the almost continuous variations in the magnitudes of the components of the transmitted signal received by the respective receiving antennas 24, 25 and 26 during animal movement, the electronic receiver 15 functions to continually detect in essentially real time the respective antenna 24, 25 and 26 receiving the best signal. For this purpose, the electronic receiver 15 includes selection circuitry for continuously selecting the respective component of the transmitted signal received by the respective antennas 24, 25 and 26 having the greatest magnitude. During operation, the selection circuitry produces an actuating output identifying the respective component having the greatest magnitude.

The selection circuitry includes measuring circuits 30, 31, and 32 respectively connected with each of the tuned antenna circuits 20, 21 and 22. The measuring circuits continuously measure the magnitudes of the respective components of the transmitted signal received by the respective receiving antennas. As shown in FIG. 1, measuring circuit 30 is connected with the tuned antenna circuit 20 to continuously measure the magnitude of the x-axis component of the signal received by antenna 24. Similarly, measuring circuit 31 is connected with tuned antenna circuit 21 to continuously measure the magnitude of the respective y-axis component of the signal received by receiving antenna 25. Likewise, measuring circuit 32 is connected with tuned antenna circuit 22 in order to continuously measure the magnitude of the z-axis component of the signal received by receiving antenna 26.

The outputs of each of the measuring circuits 30, 31 and 32 are connected to comparator circuitry 35 which continuously compares the magnitudes of the respective components of the transmitted signal received by each of the receiving antennas 24, 25 and 26. The comparator circuitry 35 then produces an actuating output identifying the respective component having the greatest magnitude.

The actuating output from the comparator circuitry 35 is supplied as an input to switch circuit 40. The switch circuit also receives the x-axis component of the transmitted signal received by antenna 24, the y-axis component of the transmitted signal received by antenna 25, and the z-axis component of the signal received by antenna 26 as separate inputs. The switch circuitry is responsive to the actuating output supplied by the comparator circuitry to transmit as an output the respective component having the greatest magnitude. The actuating output from the comparator circuitry 35 identifies which component has the greatest magnitude and, in response, the switch circuit 35 directly passes the identified component as an output from the switch circuit 35.

The electronic receiver 15 also includes conventional control circuitry 44 which is responsive to the output from the switch circuit for producing the animal control output, such as the annoying tone or electrical shock, to the animal. The control circuit 44 is a conventional circuit such as the type disclosed in U.S. Pat. No. 3,753,421 incorporated herein by reference. In operation, the control circuitry 44 generally responds in real time to the component of the transmitted signal having the greatest magnitude to produce the control output to the animal. Since the receiving antennas 24, 25 and 26 are aligned at different orientations, at least one of the antennas receives a sufficient component of the transmitted signal to provide the control output to the animal whenever the animal moves within a predetermined vicinity of the transmitting antenna.

Figure 2:
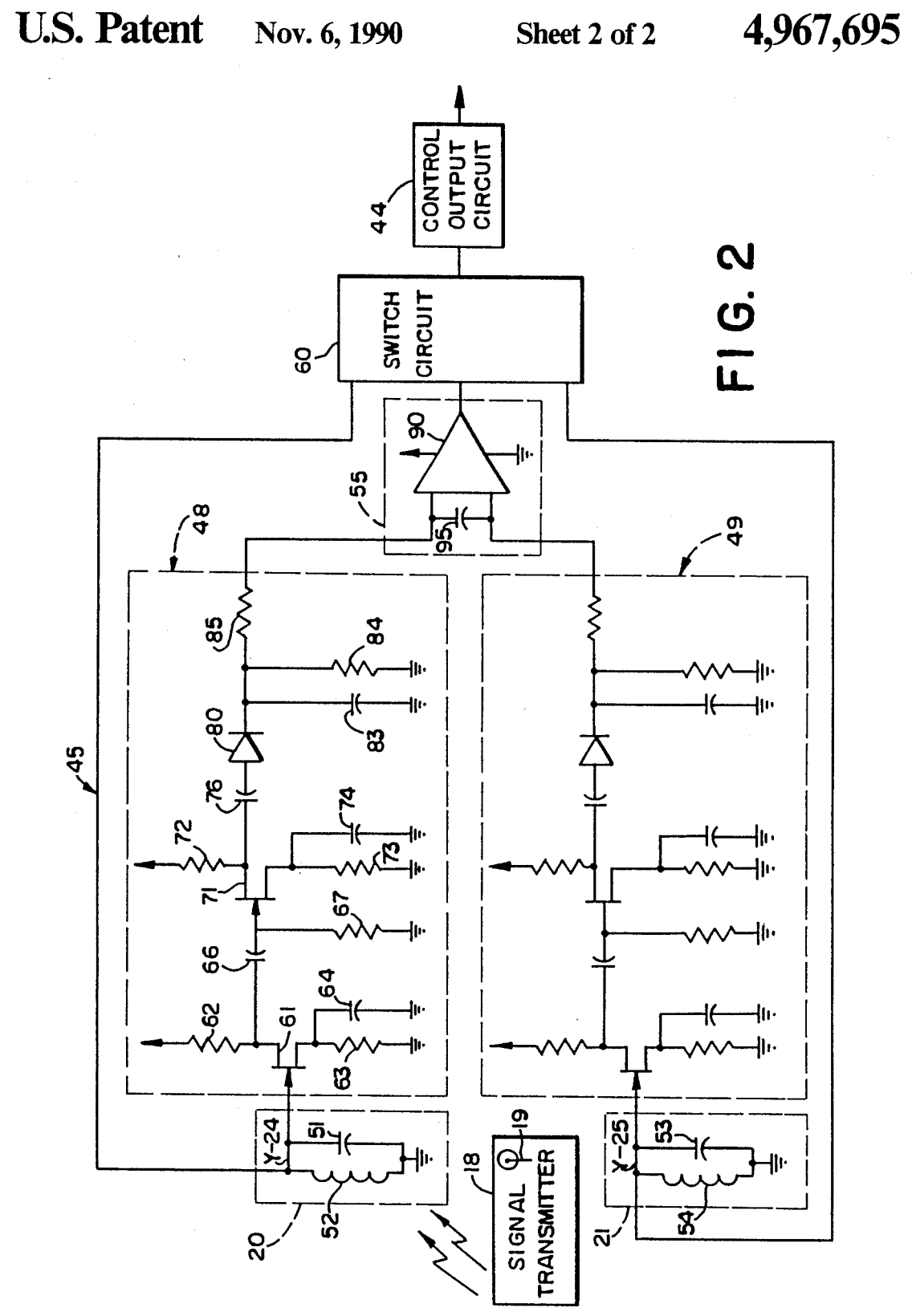

Referring to FIG. 2, an alternate system for controlling the movement of an animal relative to an area is depicted. The system is essentially the same as the embodiment previously described and illustrated except that that embodiment illustrated in FIG. 2 includes an electronic receiver 45 having only two receiving antennas 24 and 25 and slightly different associated circuitry.

As shown in FIG. 2, the electronic receiver 45 includes only a pair of tuned antenna circuits 20 and 21. Like the embodiment previously described, tuned antenna circuit 20 includes receiving antenna 24 while the other tuned antenna circuit 21 includes receiving antenna 25. The receiving antennas 24 and 25 are oriented differently relative to one another so that each receiving antenna 20 and 21 receives a respective component of the signal transmitted by the signal transmitter 18. In a preferred arrangement, the receiving antennas 24 and 25 are oriented orthogonal relative to one another.

As shown in FIG. 2, receiving antenna 24 is connected with a tuning circuit in the form of a parallel resonant LC circuit having a capacitor 51 connected in parallel with an inductor 52. Likewise, receiving antenna 25 is connected with a tuning circuit in the form of a parallel resonant LC circuit having a capacitor 53 connected in parallel with an inductor 54. Each of the parallel resonant LC circuits functions to output only a selected bandwidth of frequencies of the signal received by the respective receiving antennas. The resonant circuits are tuned to permit signals in a selected range of frequencies generally below the normal broadcast band to be passed from the receiving antennas 24 and 25 to the receiver circuitry. As such, the electronic receiver is not responsive to normal broadcast signals such as television or radio signals. The selected range of frequencies passed by the tuned circuits is generally centered about or at least incorporates the frequency of the signal from the transmitting antenna.

Tuned antenna circuits 20 and 21 are connected with selection circuitry which functions to continuously select the respective component of the transmitted signal received by the respective receiving antennas 24 and 25 having greater magnitude. The selection circuitry then produces an actuating output identifying the respective component selected as having the greater magnitude. The selection circuitry comprises a measuring circuit, generally designated 48, connected with tuned antenna circuit 20 and a similar measuring circuit, generally designated 49, connected with tuned antenna circuit 21. The measuring circuits 48 and 49 are in turn connected with comparator circuitry 55. Measuring circuit 48 is connected with the tuned antenna circuit 20 to continuously measure the magnitude of the respective component of the transmitted signal received by antenna 24 of tuned antenna circuit 20. Likewise, measuring circuit 49 is connected with tuned antenna circuit 21 in order to continuously measure the magnitude of the component of the transmitted signal received by receiving antenna 25 of tuned antenna circuit 21.

Measuring circuits 48 and 49 are identical circuits. Accordingly, only measuring circuit 48 will be described in detail with the understanding that measuring circuit 49 is similarly designed. With reference to measuring circuit 48, the output from tuned antenna circuit 20 is supplied as an input to an amplifier circuit of the measuring circuit 48. The amplifier circuit comprises a two-stage amplifier having a first stage amplifier circuit and a second stage amplifier circuit. The first stage amplifier circuit includes a common source FET transistor amplifier circuit having an FET transistor 61 with its drain connected to a voltage source through resistor 62. The voltage source is supplied from a small, dry cell battery incorporated within the electronic receiver 45. The FET transistor 61 has its source connected to ground through a parallel RC circuit including resistor 63 and capacitor 64. The output from the tuned antenna circuit 20 is supplied as an input to the gate of the FET transistor 61. The output from the first-stage amplifier circuit is supplied from the drain of the FET transistor 61 to the second-stage amplifier circuit.

The second-stage amplifier circuit also includes a common source FET transistor amplifier circuit having an FET transistor 71 with its drain connected to the voltage source through resistor 72. The FET transistor 71 has its source connected to ground through a parallel RC circuit including resistor 73 and capacitor 74.

An RC coupling circuit interconnects the first-stage amplifier circuit with the second-stage amplifier circuit. For this purpose, capacitor 66 is connected between the drain of FET transistor 61 and the gate of FET transistor 71, and a resistor 67 is connected between the gate of FET transistor 71 and ground. Capacitor 66 of the RC coupling circuit functions to permit the transmission of an AC signal from the first-stage amplifier circuit to the second-stage amplifier circuit but filters out any DC signal.

An amplified component of the transmitted signal is produced at the drain of FET transistor 71 of the second-stage amplifier circuit. This amplified component signal from the second-stage amplifier circuit is then supplied to a diode detector circuit through a coupling capacitor 76. The coupling capacitor 76 functions to filter out any DC signal from the amplified component signal which is output from the second-stage amplifier circuit. As such, the coupling capacitor 76 only permits the transmission of an AC signal.

The diode detector circuit functions as a variable peak envelope detector for detecting variable peak magnitudes of the envelopes of the AC signal. The diode detector circuit includes a diode 80 having its input connected with the drain of FET transistor 71 through the coupling capacitor 76 and its output connected with a parallel RC circuit to ground. The RC circuit includes capacitor 83 and resistor 84.

As the component of the signal received by receiving antenna 24 varies with the movement of the animal relative to the transmitting antenna 19, the amplitude of the amplified component also varies. As the amplitude of each successive envelope of the A.C. signal increases and decreases, the diode detector circuit produces a variable output signal which changes to generally correspond to the variable peak amplitude of each successive envelope of the A.C. signal. The output from the diode detector circuit is supplied through resistor 85 as an output from the measuring circuit. Resistor 85 is connected to the diode detector circuit at the output of diode 80.

The outputs from each measuring circuit 48 and 49 are in turn connected as inputs to comparator circuitry 55. The comparator circuitry 55 includes a comparator 90 which receives the outputs from the respective measuring circuits 48 and 49. Capacitor 95 is connected across the inputs to the comparator 90. The comparator circuitry 55 functions to continuously compare the variable peak magnitudes of the amplified component signal from each receiving antenna. The comparator circuitry 55 produces an actuating output representing the amplified component signal from the particular receiving antenna having the greater magnitude. The actuating output from the comparator 90 is supplied as an input to switch circuit 60.

In operation, the comparator 90 continuously compares the changing magnitudes of the envelopes of the A.C. amplified component signal from each respective receiving antenna in essentially a real time manner and produces an output identifying the particular component having the greater magnitude. Capacitor 95 does provide some time delay, however, which prevents actual instantaneous time comparisons. Capacitor 95 functions to reduce extraneous switching by the switch circuit 60 by precluding instantaneous voltage changes across the capacitor 95 and, therefore, across the inputs to the comparator 90.

Switch circuit 60 receives the component of the transmitted signal received by each of the tuned antenna circuits 20 and 21, as well as the actuating output from the comparator circuitry 55. The switch circuit 60 is responsive to the actuating output from the comparator circuitry 55 for transmitting as an output from the switch circuit the respective component of the transmitted signal received by the respective receiving antenna having the greatest magnitude. The output from the switch circuit 60 is then supplied as an input to the conventional control circuitry 44 which is responsive to the output from the switch circuitry for producing the control output, such as an annoying tone or an electrical shock, to the animal.

In operation, the electronic receiver 45 is attached to the collar of the animal. As the animal moves into the vicinity of the transmitting antenna 19, receiving antennas 24 and 25 receive respective components of the transmitted signal. The respective antenna 24 and 25 receiving the component having the greatest magnitude is then identified so that such respective component can be used to activate the control circuitry 44 to produce the control output to the animal. Ideally, at least one of the receiving antennas 24 and 25 will always receive a sufficient component of the transmitted signal when the animal moves within a predetermined range of distance of the transmitting antenna to provide a sufficient control output to the animal in order to deter further movement of the animal in the direction of the transmitting antenna.

From the foregoing description, it can be seen that the present invention provides an effective system for controlling the movement of an animal relative to an area. It should be recognized by those skilled in the art that changes or modifications may be made to the above-described embodiments without departing from the broad inventive concept of the invention. Accordingly, it should be understood that the present invention is not limited to the particular embodiments disclosed herein, but is intended to cover all modifications which are within the scope and spirit of the appended claims.

What is claimed is:

1. A system for controlling the movement of an animal relative to an area comprising a signal transmitter having a transmitting antenna associated with said area for producing a signal and an electronic receiver carried by the animal responsive to the signal for producing a control output to the animal, said electronic receiver including:
    (a) at least first and second receiving antennas for receiving the signal produced by the signal transmitter, each receiving antenna having a different orientation relative to the other receiving antenna for receiving a respective component of the signal;
    (b) selection circuitry for selecting which of the respective components has greater magnitude and for producing an actuating output identifying the respective component having greater magnitude;
    (c) switch circuitry connected with the first receiving antenna for receiving the respective component of the signal received by the first receiving antenna and connected with the second receiving antenna for receiving the respective component of the signal received by the second receiving antenna, the switch circuitry being responsive to the actuating output from the selection circuitry for transmitting as an output the respective component having greater magnitude; and
    (d) control circuitry responsive to the output from the switch circuitry for producing the control output to the animal.

2. The system in accordance with claim 1 wherein the receiving antennas are orthogonally oriented relative to one another.

3. The system in accordance with claim 1 wherein said selection circuitry comprises:
    (a) a first measuring circuit connected with the first receiving antenna for measuring the magnitude of the respective component of the signal received by the first receiving antenna; and (b) a second measuring circuit connected with the second receiving antenna for measuring the magnitude of the respective component of the signal received by the second receiving antenna.

4. The system in accordance with claim 3 in which the selection circuitry comprises comparator circuitry connected with the first and second measuring circuits for comparing the magnitude of the respective component of the signal received by the first receiving antenna with the magnitude of the respective component of the signal received by the second receiving antenna for producing said actuating output identifying the respective component having greater magnitude.

5. The system in accordance with claim 4 wherein the receiving antennas are orthogonally oriented relative to one another.

6. The system in accordance with claim 1 comprising a tuned antenna circuit for each antenna, each tuned antenna circuit including a respective one of said receiving antennas and a resonant circuit connected with such respective receiving antenna for permitting an output of only a selected range of frequencies incorporating the signal from the transmitting antenna.

7. The system in accordance with claim 1 wherein said selection circuitry includes an amplifier circuit for each receiving antenna and wherein each of the receiving antennas is connected with a respective amplifier circuit for amplifying the respective component of the signal received by the respective receiving antenna to produce an amplified component signal as an output.

8. The system in accordance with claim 7 wherein each of said amplifier circuits includes a two-stage amplifier having a first stage amplifier connected with the respective receiving antenna and a second stage amplifier connected with the first stage amplifier.

9. The system in accordance with claim 8 wherein each amplifier circuit includes an RC coupling circuit for interconnecting the first and second stage amplifiers.

10. The system in accordance with claim 7 wherein said selection circuitry includes a variable peak detector circuit for each amplifier circuit to detect variable peak magnitudes of the amplified component signal output by the respective amplifier circuit.

11. The system in accordance with claim 10 wherein said selection circuitry includes comparator circuitry connected with the respective variable peak detector circuits, the comparator circuitry comparing the variable peak magnitudes of the amplified component signals from the respective receiving antennas and producing said actuating output identifying the amplified component signal having greater magnitude.

12. A system for controlling the movement of an animal relative to an area comprising a signal transmitter having a transmitting antenna associated with said area for producing a signal and an electronic receiver carried by the animal responsive to the signal for producing a control output to the animal, said electronic receiver including:
(a) at least first, second, and third receiving antennas for receiving the signal produced by the signal transmitter, each receiving antenna having a different orientation relative to the other receiving antennas for receiving a respective component of the signal;
(b) selection circuitry for selecting which of the respective components has greatest magnitude and for producing an actuating output identifying the respective component having the greatest magnitude;
(c) switch circuitry connected with the first receiving antenna for receiving the respective component of the signal received by the first receiving antenna, connected with the second receiving antenna for receiving the respective component of the signal received by the second receiving antenna, and connected with the third receiving antenna for receiving the respective component of the signal received by the third receiving antenna, the switch circuitry being responsive to the actuating output from the selection circuitry for transmitting as an output the respective component having the greatest magnitude; and
(d) control circuitry responsive to the output from the switch circuitry for producing the control output to the animal.

13. The system in accordance with claim 12 wherein the receiving antennas are orthogonally oriented relative to one another.

14. The system in accordance with claim 12 wherein said selection circuitry comprises:
(a) a first measuring circuit connected with the first receiving antenna for measuring the magnitude of the respective component of the signal received by the first receiving antenna;
(b) a second measuring circuit connected with the second receiving antenna for measuring the magnitude of the respective component of the signal received by the second receiving antenna; and
(c) a third measuring circuit connected with the third receiving antenna for measuring the magnitude of the respective component of the signal received by the third receiving antenna.

15. The system in accordance with claim 14 in which the selection circuitry comprises comparator circuitry connected with the first, second and third measuring circuits for comparing the magnitudes of the respective components received by the first, second, and third receiving antennas for producing said actuating output identifying the respective component having the greatest magnitude.

16. The system in accordance with claim 15 wherein the receiving antennas are orthogonally oriented relative to one another.

17. The system in accordance with claim 12 comprising a tuned antenna circuit for each antenna, each tuned antenna circuit including a respective one of said receiving antennas and a resonant circuit connected with such respective receiving antenna for permitting an output of only a selected range of frequencies incorporating the signal from the transmitting antenna.

18. A system for controlling the movement of an animal relative to an area comprising a signal transmitter having a transmitting antenna associated with said area for producing a signal and an electronic receiver carried by the animal responsive to the signal for producing a control output to the animal, said electronic receiver including:
a. at least first and second tuned receiving antenna circuits for receiving the signal produced by the signal transmitter, each tuned antenna circuit including a respective receiving antenna, with each respective receiving antenna having a different orientation relative to the other receiving antenna so that each respective receiving antenna receives a respective component of the signal, and wherein each tuned antenna circuit includes a tuning circuit connected with the respective receiving antenna for permitting an output of only a selected range of frequencies incorporating the signal from the transmitting antenna;

b. an amplifier circuit for each tuned antenna circuit, each amplifier circuit being connected with a respective one of the tuned antenna circuits for amplifying the respective component from such respective tuned antenna circuit to produce an amplified component signal as an output, each amplifier circuit comprising a two-stage amplifier having a first stage amplifier and a second stage amplifier;

c. a variable peak detector circuit for each amplifier circuit, each variable peak detector circuit detecting variable peak magnitudes of the respective amplified component signal from the respective amplifier circuit;

d. comparator circuitry connected with the respective variable peak detector circuits for comparing the variable peak magnitudes of the amplified component signals from the respective receiving antennas and for producing an actuating output representing the amplified component signal having the greater magnitude;

e. a switch circuit separately connected with each tuned antenna circuit for receiving the component of the signal received by each of the tuned antenna circuits and connected with the comparator circuitry for receiving the actuating output from the comparator circuitry, the switch circuit being responsive to the actuating output from the comparator circuitry for transmitting as an output the respective component of the signal having the greater magnitude received by one of the tuned receiving antenna circuits; and f. control circuitry responsive to the output from the switch circuit for producing the control output to the animal.

* * * * *

UNITED STATES PATENT AND TRADEMARK OFFICE
CERTIFICATE OF CORRECTION

PATENT NO. : 4,967,695

DATED : November 6, 1990

INVENTOR(S) : James M. Giunta

It is certified that error appears in the above-identified patent and that said Letters Patent is hereby corrected as shown below:

Column 1, line 63, after "approach" delete "Lhe" and insert
--the transmitting antenna buried beneath the ground, the transmitted signal may not always be effectively received by the receiving antenna. As a result, an animal can sometimes approach the--.

Signed and Sealed this

Twentieth Day of October, 1992

*Attest:*

DOUGLAS B. COMER

*Attesting Officer*   *Acting Commissioner of Patents and Trademarks*